(12) United States Patent
Lee et al.

(10) Patent No.: US 7,451,227 B2
(45) Date of Patent: Nov. 11, 2008

(54) METHOD FOR PATH MTU DISCOVERY ON IP NETWORK AND APPARATUS THEREOF

(75) Inventors: Hak-goo Lee, Suwon-si (KR); Young-keun Kim, Suwon-si (KR); Sun-woo Kim, Suwon-si (KR); Yong-jun Lim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1022 days.

(21) Appl. No.: 10/401,731

(22) Filed: Mar. 31, 2003

(65) Prior Publication Data

US 2003/0188015 A1 Oct. 2, 2003

Related U.S. Application Data

(60) Provisional application No. 60/368,378, filed on Mar. 29, 2002.

(30) Foreign Application Priority Data

Jun. 18, 2002 (KR) ............... 10-2002-0034131

(51) Int. Cl.
*G06F 15/16* (2006.01)
(52) U.S. Cl. ............... 709/232; 370/474; 370/248; 370/230
(58) Field of Classification Search ........... 709/232; 370/248, 274, 230–235
See application file for complete search history.

(56) References Cited

U.S. PATENT DOCUMENTS

| 5,425,023 | A | * | 6/1995 | Haraguchi et al. | ........... 370/400 |
| 5,892,753 | A | * | 4/1999 | Badt et al. | ............... 370/233 |
| 5,959,974 | A | * | 9/1999 | Badt et al. | ............... 370/233 |
| 6,341,129 | B1 | * | 1/2002 | Schroeder et al. | ........... 370/354 |
| 6,973,097 | B1 | * | 12/2005 | Donzis et al. | ............... 370/470 |

(Continued)

FOREIGN PATENT DOCUMENTS

EP 1 104 141 A2 5/2001

OTHER PUBLICATIONS

Alex Conta, Internet Control Message Protocol(ICMPv6) for the Internet Protocol Version 6 (IPV6) Specification, Dec. 1998, Network Working Group 2463, p. 1-17.*

(Continued)

*Primary Examiner*—Bunjob Jaroenchonwanit
*Assistant Examiner*—Duyen M Doan
(74) *Attorney, Agent, or Firm*—Sughrue Mion, PLLC

(57) ABSTRACT

A method for more efficiently operating a network, and more particularly, for discovery of a path maximum transmission unit (PMTU) between nodes on an IP network, is provided. The method includes (a) comparing the size of a received packet with a maximum transmission unit (MTU) of a next link; and (b) if the size of the received packet is greater than the MTU of the next link, generating an error message, transmitting the generated error message to a source node, generating a test message of the size of the MTU of the next link, and transmitting the generated test message to a destination node. According to the PMTU discovery method, a PMTU can be determined in a shorter time, and it is possible to minimize the use of network resources.

19 Claims, 8 Drawing Sheets

U.S. PATENT DOCUMENTS

2002/0141448 A1* 10/2002 Matsunaga .................. 370/469

OTHER PUBLICATIONS

Alex Conta, Internet Control Message Protocol (ICMP v6) for the Internet Protocol Version 6 (IPV6) Specification, Dec. 1998, Networking Group 2463, p. 1-7.*

Auge A., et al.., "Performance Optimisation Evaluation of TCP/IP over Wireless Networks" IEEE International Performance, Computing and Communications, Feb. 1998, pp. 395-401.

Moldeklev K, et al. "How a Large ATM MTU Causes Deadlocks in TCP Data Transfers" IEEE/ACM Transactions on Networking, vol. 3, Issue 4, Aug. 1995, pp. 409-422.

* cited by examiner

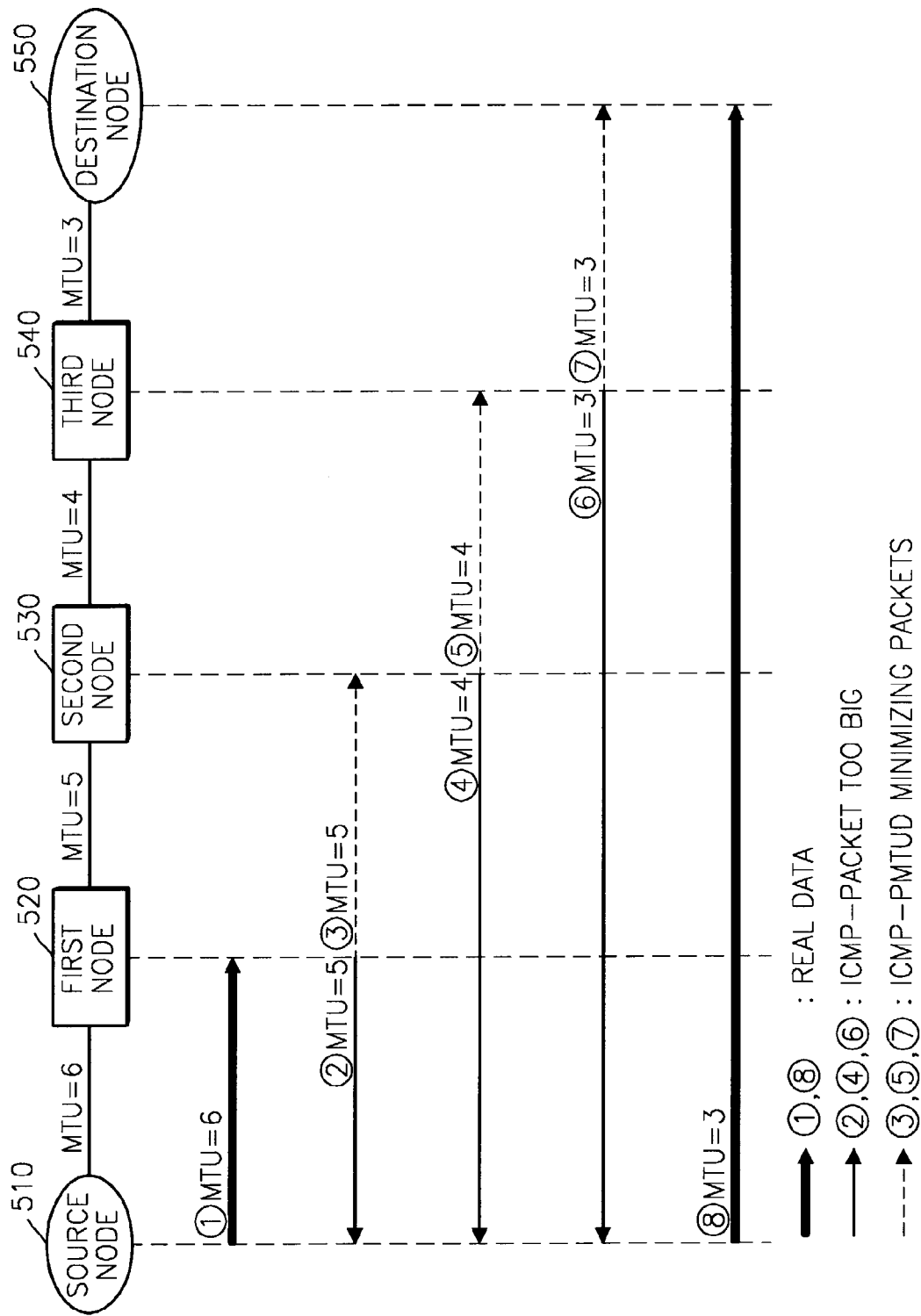

FIG. 6

| SOURCE NODE | DESTINATION NODE | MTU |
|---|---|---|
| A | B | C |
| D | E | F |
| ⋮ | | |

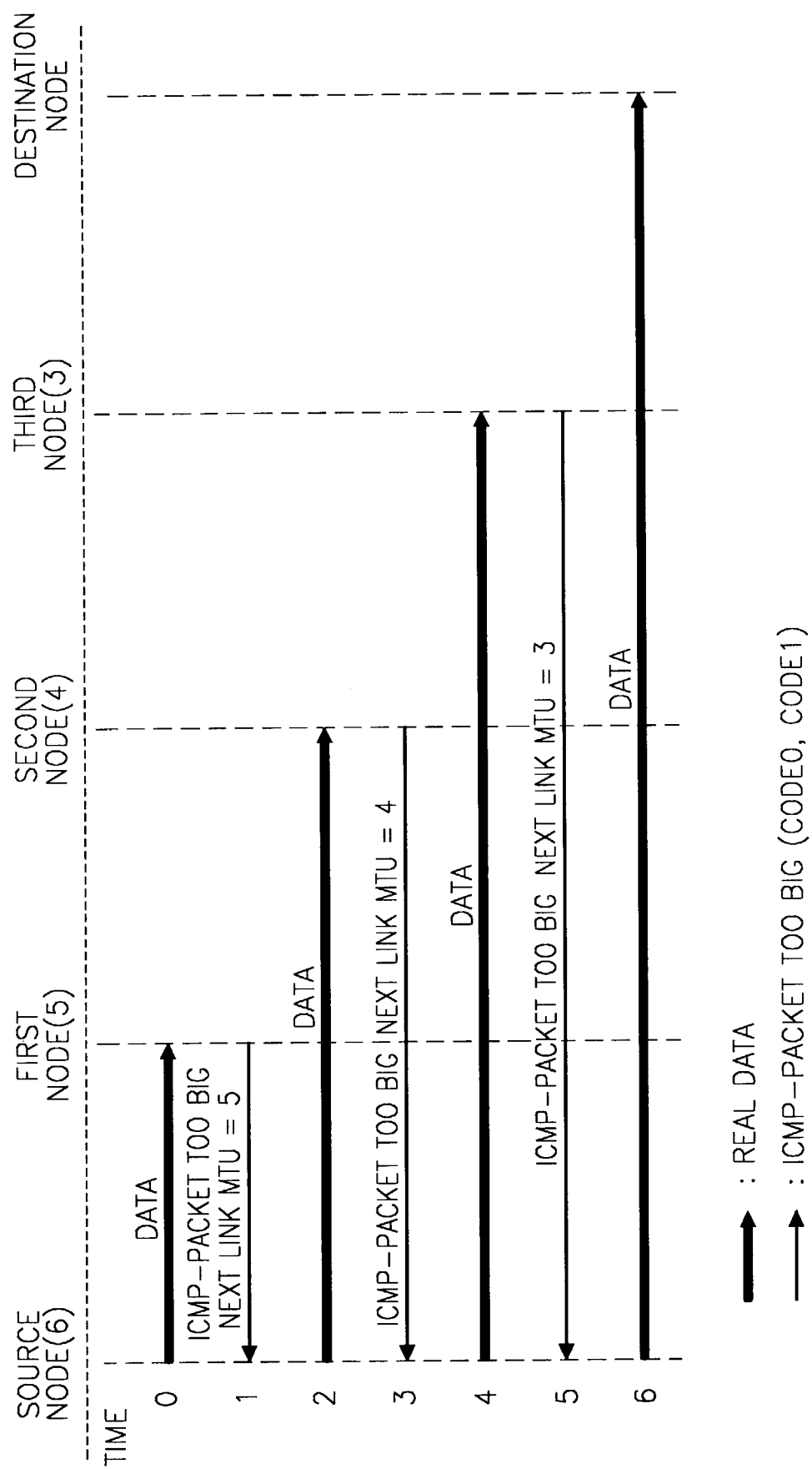

METHOD FOR PATH MTU DISCOVERY ON IP NETWORK AND APPARATUS THEREOF

This application claims the benefit of Provisional Application No. 60/368,378 filed Mar. 29, 2002; the disclosure of which is incorporated herein by reference. Also, the present application is based on Korean Patent Application No. 2002-34131, filed Jun. 18, 2002, which is incorporated herein by reference.

BACKGROUND OF THE INVENTION

1. Field of the Invention

The present invention relates to a method and apparatus for efficiently operating a network, and more particularly, to a method and apparatus for efficiently performing discovery of a maximum transmission unit (MTU) on a path of a network.

2. Description of the Related Art

As the number of Internet users has been rapidly increasing recently, the 32-bit address system in the networks based on the related art Internet Protocol version 4 (IPv4) has shown the limits of Internet protocol (IP) addresses and functional restrictions. To solve these problems, related art Internet Protocol version 6 (IPv6), by which a variety of services can be provided through diverse expanded functions with a 128-bit address system, has been proposed.

In the related art IPv4, when the size of a packet is greater than a link MTU, a router located on a routing path performs fragmentation of the packet. However, in the IPv6 (unlike in the IPv4), if a packet is transmitted by a source node, a node in the middle of a path does not perform fragmentation of the packet. Instead, the source node searches for a minimum MTU on a path, fragments packets according to the discovered MTU, and transmits fragmented packets.

Accordingly, when an IPv6 node, that is, a source node, is desired to transmit data to a destination node in a remote location, a link MTU of a path through which a packet is transmitted is first discovered. That is, a path MTU (hereinafter referred to as "PMTU") that is a minimum link MTU in a routing path between the source node and the destination node should be determined.

According to the related art PMTU discovery method, when a source node first transmits a packet, the source node fragments the packet in units each having the size of a next-hop link MTU, and transmits the fragmented packet.

When the size of a packet transmitted from the source node is greater than a link MTU between hops in the routing path, this packet is discarded, and an Internet Control Message Protocol (ICMP)-Packet Too Big message containing next-hop link MTU information is generated and transmitted to the source node. Using the MTU information of the ICMP-Packet Too Big message, the source node fragments the packet again, and transmits it again. The aforementioned related art routine is repeated until the packet arrives at the destination node without being discarded after being transmitted by the source node.

FIG. 1 is a diagram showing a process of PMTU discovery by using the related art PMTU discovery method when the link MTU between a source node 110 and a destination node 150 decreases in the order of 6, 5, 4, and 3.

First, a source node 110 generates a packet ① (MTU=6) based on the MTU value 6 to the next node, a first node 120, and transmits the packet to the first node 120. Since the size of the received packet ① (MTU=6) is greater than the next-hop link MTU value 5, a first node 120 discards the received packet ① (MTU=6), and generates an ICMP error message containing next-hop link MTU information, which is MTU=5. That is, the first node 120 generates an ICMP Packet Too Big message ② (MTU=5), and transmits the message to the source node 110.

The source node 110 fragments the packet again according to the next-hop link MTU value, that is, MTU=5, of the first node 120 contained in the received ICMP Packet Too Big message ② (MTU=5) transmitted by the first node 120, and transmits the re-fragmented packet ③ (MTU=5) to the destination node 150.

Since the size of the received packet ③ (MTU=5) is greater than the next-hop link MTU value, that is, MTU=4, a second node 130 discards the received packet ③ (MTU=5), generates an ICMP error message ④ (MTU=4) containing the next-hop link MTU information, and transmits the message to the source node 110. As in the previous step, the source node 110 fragments the packet to satisfy the new link MTU=4, and transmits the fragmented packet ⑤ (MTU=4) to the destination node 150.

As in the first and second nodes, since the size of the received packet ⑤ (MTU=4) is greater than the next-hop link MTU value, that is, MTU=3, a third node 140 discards the received packet ⑤ (MTU=4), generates an ICMP error message ⑥ (MTU=3) containing the next-hop link MTU information, and transmits the message to the source node 110. As in the previous step, the source node 110 fragments the packet to satisfy the new link MTU, and transmits the fragmented packet ⑦ (MTU=3) to the destination node 150.

The related art scheme has various problems and disadvantages. For example, but not by way of limitation, in the related art PMTU discovery method, in order to discover a PMTU between the source node and destination node, much time is spent (e.g., performing fragmentation) and network resources are unnecessarily wasted.

SUMMARY OF THE INVENTION

It is an object of the present invention to overcome at least the problems and disadvantages of the related art.

The present invention provides a method and apparatus for efficient PMTU discovery.

According to an aspect of the present invention, there is provided a method for discovery of a path maximum transmission unit (PMTU) among nodes on an Internet protocol (IP) network, the method comprising: (a) comparing the size of a received packet with a maximum transmission unit (MTU) of a next link; and (b) if the size of the received packet is greater than the MTU of the next link, generating an error message, transmitting the generated error message to a source node, generating a test message of the size of the MTU of the next link, and transmitting the generated test message to a destination node.

It is preferable that the error message is an Internet Control Message Protocol (ICMP) error message which uses one of bits [0:127] in a "Type" field of an ICMP message of Internet Protocol version 6 (IPv6).

It is preferable that the test message is an ICMP information message that uses one of bits [128:255] in a "Type" field of an ICMP message of IPv6.

It is preferable that the error message generated in the step (b) contains MTU information of a next link.

It is preferable that the test message generated in the step (b) contains source address and destination address information of the received packet.

It is preferable that the method further comprises (c) storing MTU information, source address information and destination address information contained in the received packet, wherein the received packet is a test message generated by a previous node.

It is preferable that the method further comprises (d) comparing the MTU information, source address information, and destination address information of a packet received after transmitting the error message generated in step (b) to the source node, with the MTU information, source address information, and destination address information stored in step (c), and if the information in these comparisons is the same, transmitting the error message generated in step (b) without generating an error message and a test message, and then discarding the received packet.

According to another aspect of the present invention, there is provided an apparatus for discovery of a path maximum transmission unit (PMTU) among nodes on an Internet protocol (IP) network, the apparatus comprising: a determining unit which determines whether or not the size of a received packet exceeds the MTU of a next link; an error message generation and transmission unit which if it is determined that the size of the received packet is greater than the MTU of the next link, generates an error message and transmits the generated error message to a source node; and a test message generation and transmission unit which generates a test message of the size of the MTU of a next link and transmits the generated test message to a destination node.

It is preferable that the generated error message contains MTU information of a next link.

It is preferable that the generated test message contains source address and destination address information of the received packet.

It is preferable that when the MTU information, source address information, and destination address information of a packet received after transmitting the generated error message to the source node are compared with the stored MTU information, source address information, and destination address information. If the information in these comparisons is the same, the generated error message is transmitted without generating an error message and a test message and the received packet is discarded.

It is preferable that the apparatus is any one of a router, a bridge, and a switch that support IPv6.

According to another embodiment, a router for discovering a path maximum transmission unit (PMTU) among nodes on an Internet protocol (IP) network is provided. The router includes a determining unit that determines whether a size of a received packet exceeds the MTU of a next link, an error message generation and transmission unit that, when the size of the received packet is greater than the MTU of the next link, generates an error message and transmits the generated error message to a source node, and a test message generation and transmission unit that generates a test message of the size of the MTU of a next link and transmits the generated test message to a destination node, wherein the router supports IPv6.

According to yet another embodiment, a computer readable medium containing a set of instructions for discovering a path maximum transmission unit (PMTU) among nodes on an Internet protocol (IP) network is provided. The instructions include (a) comparing a size of a received packet with a maximum transmission unit (MTU) of a next link, and (b) when the size of the received packet is greater than the MTU of the next link, generating an error message, transmitting the generated error message to a source node, generating a test message of the size of the MTU of the next link, and transmitting the generated test message to a destination node.

BRIEF DESCRIPTION OF THE DRAWINGS

The above objects and advantages of the present invention will become more apparent by describing in detail preferred embodiments thereof with reference to the attached drawings in which:

FIG. 5 is a diagram showing a path MTU (PMTU) method according to an exemplary, non-limiting embodiment of the present invention;

FIG. 6 is a diagram showing a storage space shape of a node according to an exemplary, non-limiting embodiment of the present invention;

FIG. 7A is a diagram showing time and hop count spent in PMTU discovery according to the related art PMTU discovery method.

DESCRIPTION OF THE PREFERRED EMBODIMENTS

First, terminologies used in this specification are defined as follows:

node: a device that implements IPv6.

router: a node that forwards IPv6 packets not explicitly addressed to itself.

host: any node that is not a router.

upper layer: a protocol layer immediately above IPv6. For example, transport protocols such as TCP and UDP, control protocols such as ICMP path maximum transmission unit discovery (PMTU) Minimizing Packet: a newly defined ICMP information message.

link: a communication facility or medium over which nodes can communicate at the link layer.

packet: an IPv6 header plus a payload.

link MTU: the maximum transmission unit.

path: the set of links traversed by a packet between a source node and a destination node path MTU (PMTU): the minimum link MTU of all the links in a path between a source node and a destination node.

Figure 1:
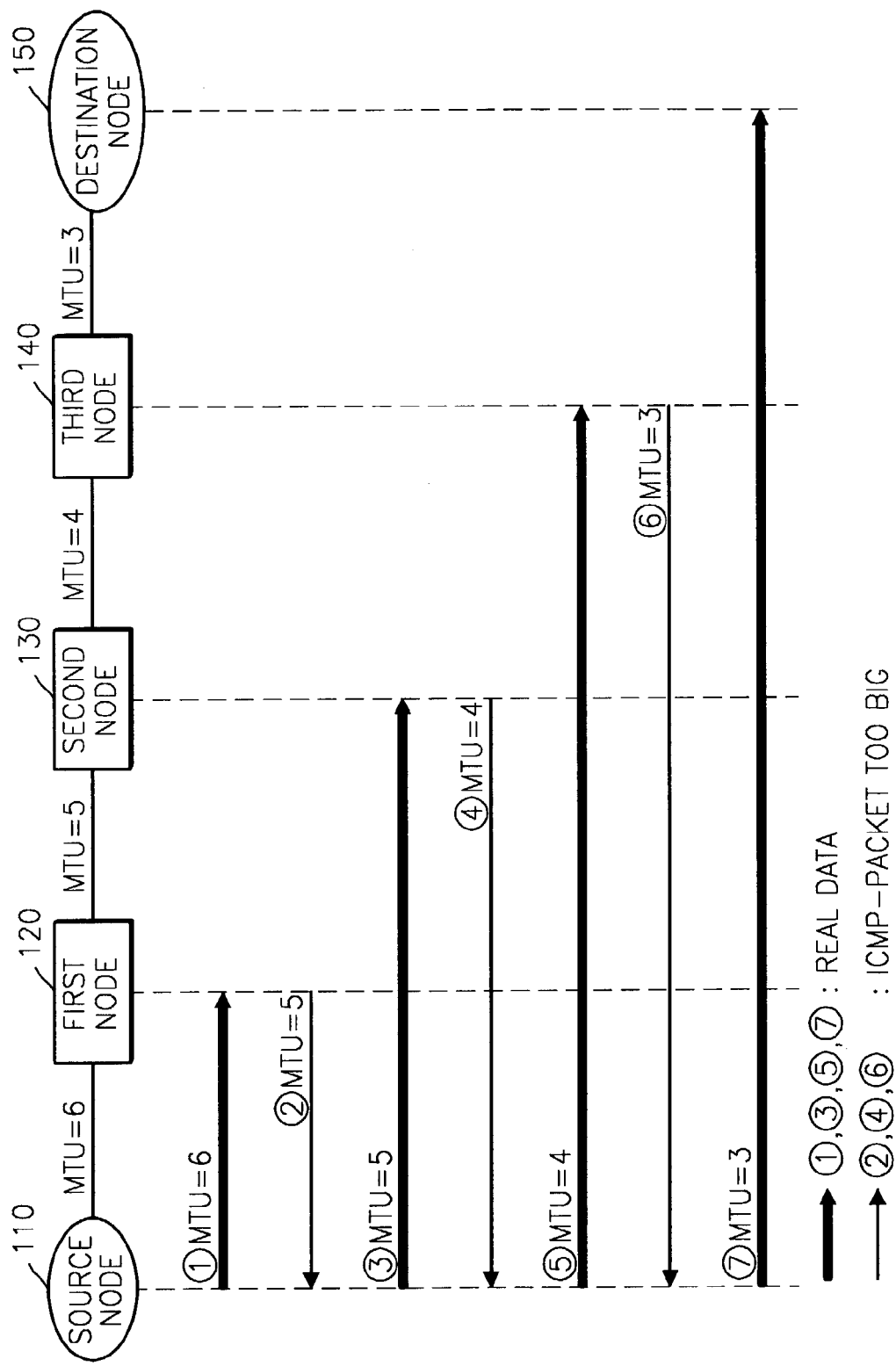
FIG. 1 is a diagram showing a related art path maximum transmission unit (MTU) discovery method.
Figure 2:
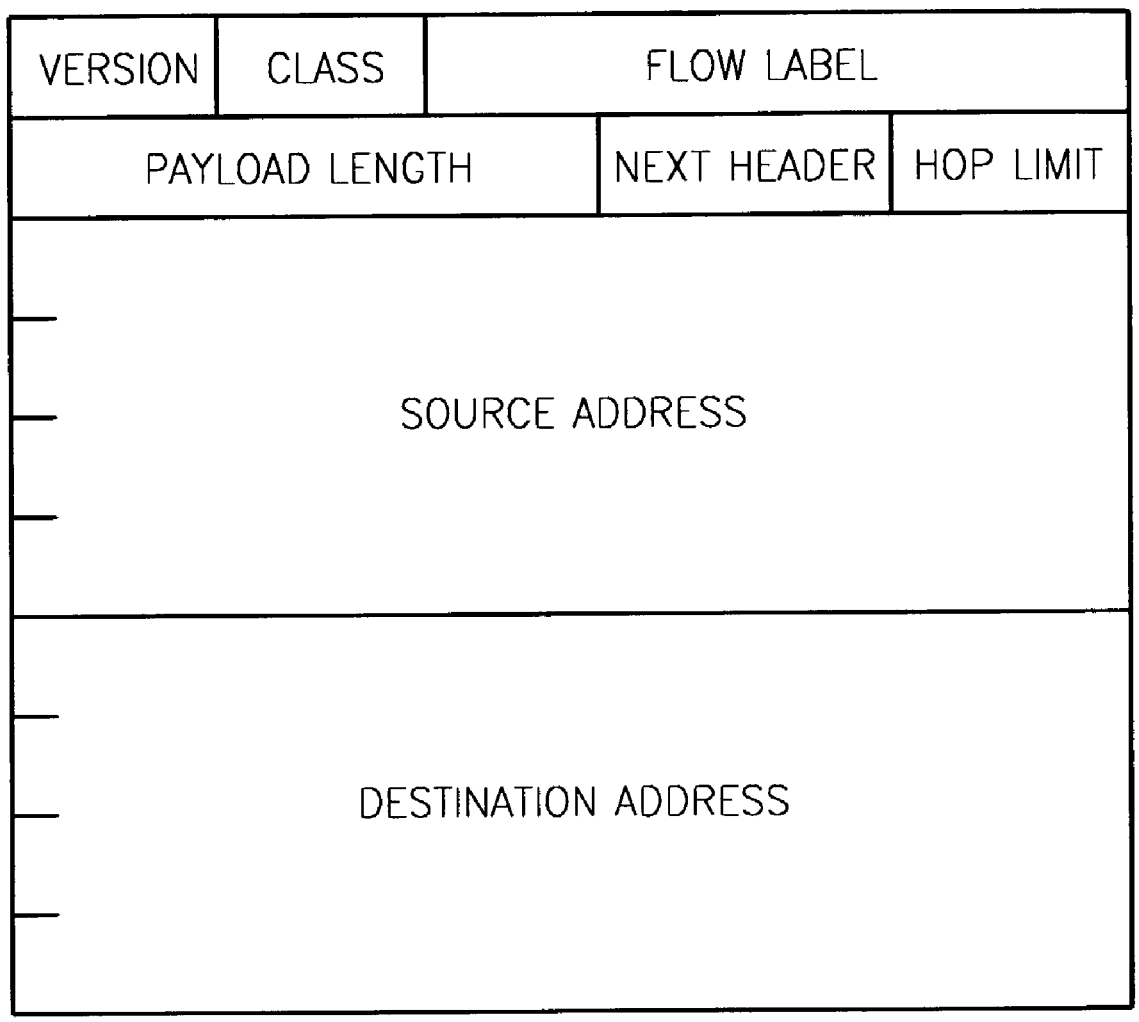
FIG. 2 is a diagram of a basic header of Internet Protocol version 6 (IPv6) according to an exemplary, non-limiting embodiment of the present invention.

FIG. 2 is a diagram of a basic header of IPv6 used in the present invention. All packets of IPv6 begin with a basic header formed with 40 bytes. "Version" of FIG. 2 indicates the version of IP, and "Payload Length" indicates the length of an IP packet in units of bytes. "Next Header" indicates which extension header follows the IP basic header, and "Hop Limit" is used to restrict in units of hops a distance for transmitting an IP packet. "Source Address" and "Destination Address" indicate the address of a host transmitting a packet and the address of a destination to which the packet should be transmitted, respectively. The length of the address is 128 bits.

Figure 3A:
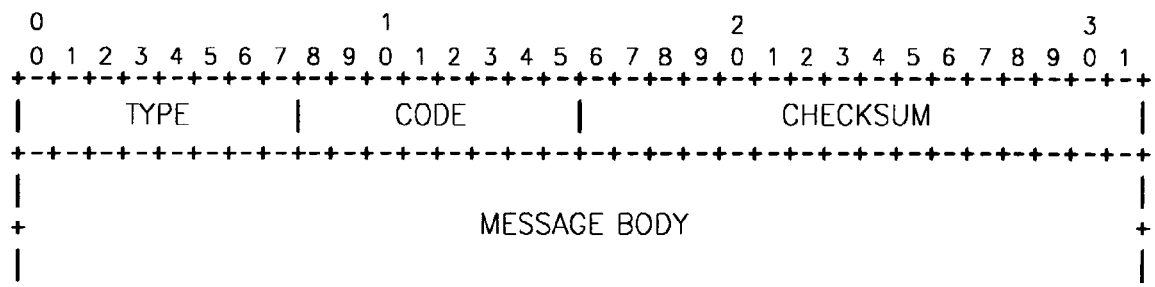
FIG. 3A is a diagram showing a basic structure of an ICMPv6 message according to an exemplary, non-limiting embodiment of the present invention.

FIG. 3A is a diagram showing a basic structure of an ICMPv6 message used in the present invention. In a "Type" field of the ICMPv6 message, type numbers 0 to 127 are used in transmitting a message on an error, and type numbers 128 to 255 are used in transmitting an information message. In an ICMP-Packet Too Big message used in discovering a PMTU, the type number in the "Type" field is 2.

Figure 3B:
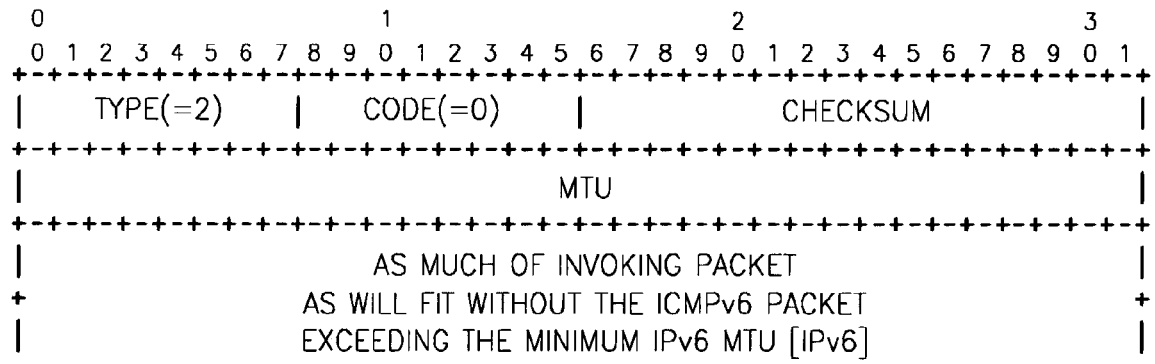
FIG. 3B is a diagram showing a basic structure of an ICMP-Packet Too Big message according to an exemplary, non-limiting embodiment of the present invention.

FIG. 3B is a diagram showing a basic structure of an ICMP-Packet Too Big message when the value in the "Type" field of an ICMPv6 message is 2. The value in the "Type" field of the ICMPv6 message is set to 2, and the value in a "Code" field is usually set to 0 by a sender, and is neglected by a receiver. "MTU" field indicates a next-hop link MTU value. The destination address of an ICMP-Packet Too Big message is copied from the source address of the IP header of the received original packet.

Figure 4A:
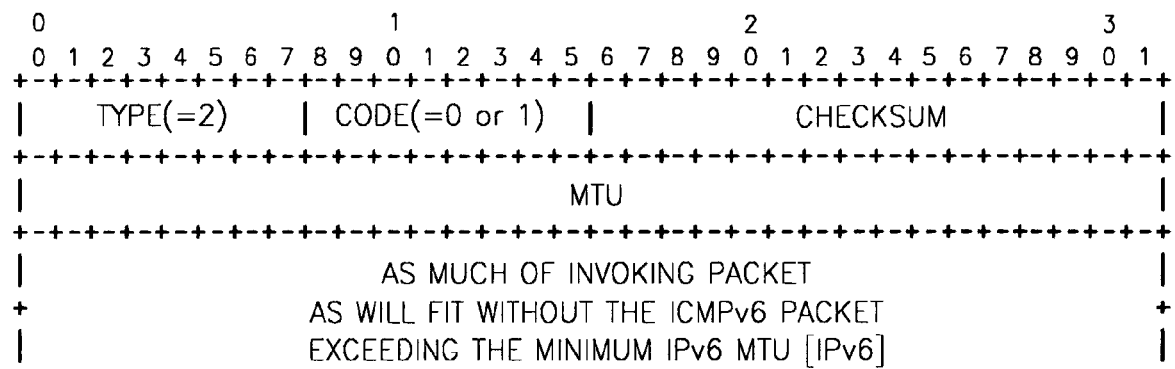
FIG. 4A is a diagram showing a basic structure of a modified ICMP-Packet Too Big message according to an exemplary, non-limiting embodiment of the present invention.

FIG. 4A is a diagram showing a basic structure of a modified ICMP-Packet Too Big message used in a PMTU discovery method according to the present invention. The modified ICMP-Packet Too Big message shown in FIG. 4A has the same structure as that of the ICMP-Packet Too Big message of FIG. 3B except that the value of the "Code" field is 0 or 1.

When an ICMP-Packet Too Big message is generated for a data packet transmitted from the source node, the value in the "Code" field is set to 0. When an ICMP-Packet Too Big message is generated for a PMTUD Minimizing Packet having a "Type" field value of 143, which will be explained later, the value in the "Code" field is set to 1.

In an embodiment for explaining the PMTU discovery method according to the present invention, the value in the "Code" field is 0 or 1. However, even when the ICMP-Packet Too Big message of FIG. 3B, in which the value in the "Code" field is set to 0, is selectively used, the PMTU discovery method according to the present invention can be implemented.

Figure 4B:
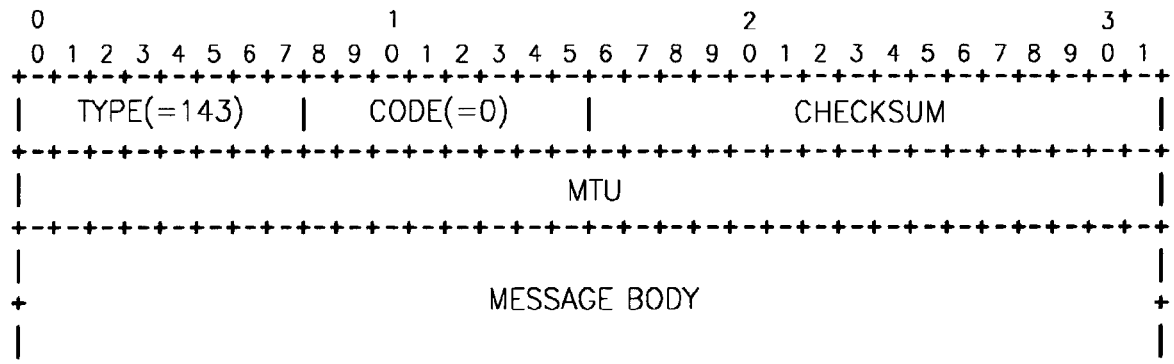
FIG. 4B is a diagram showing a basic structure of a newly defined ICMP-PMTUD Minimizing Packet according to an exemplary, non-limiting embodiment of the present invention.

FIG. 4B is a diagram showing a newly defined ICMP information message i.e., an ICMP-PMTUD Minimizing Packet used in the PMTU discovery method according to the present invention. At present, type numbers 128 to 255 can be used in an ICMP information message and type numbers 128 to 142 have been used.

In an embodiment for explaining a protocol according to the present invention, a new ICMP information message having a "Type" field value of 143 is generated and used. However, it is also possible to use the PMTU discovery method according to the present invention, by using another "Type" field number that is not 143, and is not defined at present.

The value 143 indicating the PMTUD Minimizing Packet, which is newly defined according to the present invention, is stored in the "Type" field of the ICMP information message shown in FIG. 4b, and the value stored in the "Code" field is set to 0.

In the "MTU" field, the next-hop link MTU value is stored. The source address of the previous packet being discarded is stored as a source address value, and the destination address of the previous packet being discarded is stored as a destination address value.

The newly defined ICMP information message, that is, the PMTUD Minimizing Packet, is transmitted to the destination node unlike the ICMP Packet Too Big message. To make the size of the message meet the next-hop link MTU, the message is filled with dummy data.

The PMTU discovery method according to the present invention is performed by using the modified ICMP Packet Too Big message of FIG. 4A and the ICMP-PMTUD Minimizing Packet, that is, the newly defined ICMP information message of FIG. 4B.

According to the PMTUD discovery method of the present invention, in a node on a routing path, if the next-hop link MTU is less than the size of the transmitted packet, the present node discards the packet transmitted by the source node, generates the ICMP-Packet Too Big message shown in FIG. 4A, and transmits the generated ICMP-Packet Too Big message to the source node. The present node sends the ICMP-PMTUD Minimizing Packet which is generated to meet the next-hop link MTU, to the destination node.

Also, if the ICMP-PMTUD Minimizing Packet again becomes less than the next-hop link MTU in an arbitrary node in the path when being transmitted to the destination node, the arbitrary node discards the transmitted ICMP-PMTUD Minimizing Packet, generates an ICMP-Packet Too Big message containing the next-hop link MTU information, and transmits the message to the source node. Here, the value in the "Code" field of the ICMP-Packet Too Big message becomes 1. As in the previous case, the arbitrary node generates an ICMP-PMTUD Minimizing Packet which has the same as the next-hop link MTU, and transmits the packet to the destination node.

Also, after receiving the ICMP-Packet Too Big message having the "Code" field value of 0, the source node fragments the packet according to the link MTU value contained in the ICMP-Packet Too Big message and transmits the fragmented packet.

If the source node receives an ICMP-Packet Too Big message having a "Code" field value of 1 before the source node transmits the packet fragmented according to the link MTU value contained in the ICMP-Packet Too Big message, the packet fragmented according to the link MTU value contained in the previous ICMP-Packet Too Big message should be discarded.

Before transmitting the packet fragmented according to the link MTU value included in the ICMP-Packet Too Big message, if the source node receives an ICMP-Packet Too Big message having the "Code" field value of 0, the source node receives an ICMP-Packet Too Big message having the "Code" field value of 1, the already fragmented packet is discarded, and the packet is again fragmented according to the size of the MTU value included in the ICMP-Packet Too Big message having the "Code" field value of 1, and transmitted.

According to a preferred embodiment of the present invention, even if the packet, which is fragmented according to the MTU information contained in the ICMP-Packet Too Big message having the "Code" field value of 0 and becomes of no use, is transmitted before the source node receives the ICMP-Packet Too Big message having the "Code" field value of 1, the transmitted packet is automatically discarded in a node which generated the ICMP-Packet Too Big message having the "Code" field value is 1.

This is performed by using a node which has the following functions according to the present invention.

Figure 6:
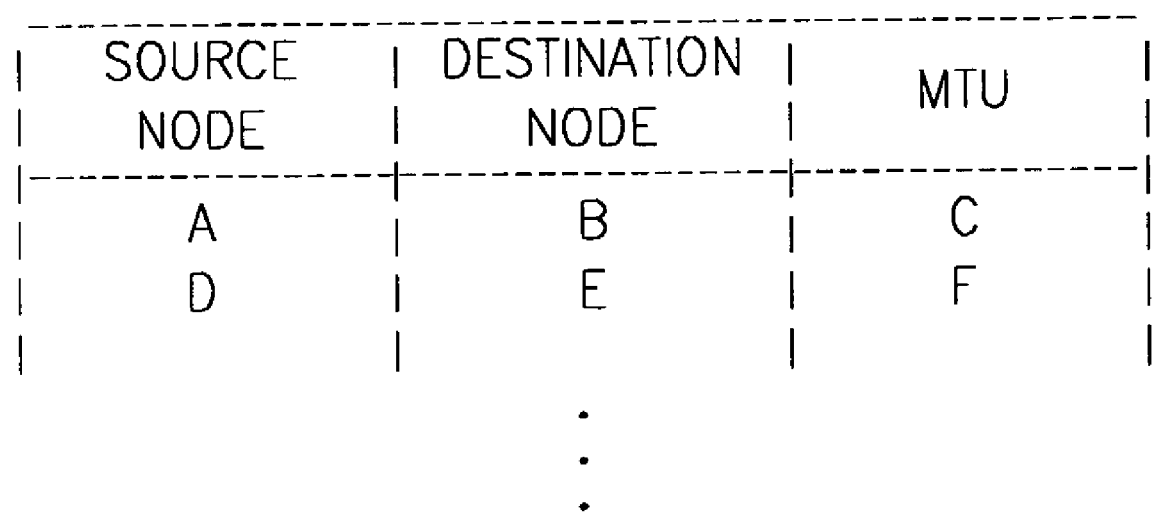

A node which generates an ICMP-Packet Too Big message having the "Code" field value of 1, for example, a router, stores a source address, a destination address, and a PMTU value, which are stored in an ICMP-PMTUD Minimizing Packet transmitted from the previous node, in its storage space having the structure shown in FIG. 6, for example, a cache. According to a non-limiting, exemplary preferred embodiment of the present invention, the duration for which these items can be stored in the cache is not long. These items should be stored only for a period for PMTU discovery, and after that time, these items are automatically deleted.

After storing these items, if a packet from the source node arrives at this node, the node compares the source address, destination address and PMTU value of the packet with the values stored in the cache of the node. If the values are the same, the node deems that the packet is a packet to which an ICMP-Packet Too Big message having the "Code" field value of 1 is not applied. That is, the node deems that the packet was fragmented by the previous ICMP-Packet Too Big message and transmitted before the ICMP-Packet Too Big message having the "Code" field value of 1, the message which the node generated and transmitted, arrives at the source node, and discards the packet without generating an ICMP-Packet Too Big message having the "Code" field value of 0.

The foregoing aspect of the present invention prevents generating and transmitting again an ICMP-Packet Too Big message when a packet, which is again fragmented by an ICMP-Packet Too Big message that is transmitted by the previous node, arrives after an ICMP-Packet Too Big message having the "Code" field value generated and transmitted to the source. By doing so, the unnecessary use of network resources can be prevented.

Thus, when another PMTU discovery method is used in the present invention, it is possible to reduce time spent in discovery of a PMTU without the unnecessary use of additional network resources, compared to the related art PMTU discovery method.

FIG. 5 is a diagram showing an embodiment for PMTU discovery using a PMTU discovery method and apparatus according to the present invention when the link MTU between a source node 510 and a destination node 550 decreases in the order of 6, 5, 4, and 3.

A PMTU discovery method using the modified ICMP-Packet Too Big message of FIG. 4A and the ICMP PMTUD Minimizing Packet, which is the newly defined ICMP information message of FIG. 4B according to the present invention, will now be explained.

In FIG. 5, the source node 510, which operates as a host, includes a function unit that distinguishes whether the value of the "Code" field of the modified ICMP-Packet Too Big message is 0 or 1, and immediately after this message is received, newly defines a PMTU and retransmits a packet satisfying the size of the new PMTU.

Each of the first node 520, the second node 530, and the third node 540 includes a function unit that distinguishes whether the "Code" field of the modified ICMP-Packet Too Big message is 1 or 0 as in the source node, and generates the modified ICMP-Packet Too Big message of FIG. 4A and the ICMP-PMTUD Minimizing Packet, which is the newly defined ICMP information message of FIG. 4B. Also, each of these nodes comprises a storage space, as shown in FIG. 6, for example, a cache (not shown), for storing the source address, destination address, and previous PMTU information stored in the discarded ICMP-PMTUD Minimizing Packet, for a predetermined time, when the ICMP-PMTUD Minimizing Packet is discarded.

The source node 510 transmits packet ①, which is fragmented according to the next-hop link MTU value, that is, MTU=6, to the destination node 550.

Since the size of the received packet ① is greater than the next-hop link MTU value of 5, the first node 520 generates an ICMP-Packet Too Big message containing the next-hop link MTU information, that is, MTU=5, and transmits the message to the source node 510. Here, since this message is an ICMP error message for the data packet, which is originally desired to be transmitted by the source node 510, the value in the "Code" field is 0. The first node 520 also generates an ICMP-PMTUD Minimizing Packet ③ which is generated to satisfy the next-hop link MTU=5 as shown in FIG. 4B, and transmits the packet to the destination node 550.

Since the size of the ICMP-PMTUD Minimizing Packet ③ transmitted by the first node 520 is greater than the next-hop link MTU value 4, the second node 530 generates an ICMP-Packet Too Big message ④ containing the next-hop link MTU information, that is, MTU=4, and transmits the message to the source node 510. Here, since the message is about an ICMP-PMTUD Minimizing Packet, the value in the "Code" field is 1. Also, the second node 530 stores information stored in the "MTU", "Source Address," and "Destination Address" fields of the previous ICMP-PMTUD Minimizing Packet, that is, the ICMP-PMTUD Minimizing Packet ③ transmitted by the first node 520, in a storage space, for example, a cache having the structure shown in FIG. 6. In addition, the second node 530 generates an ICMP-PMTUD Minimizing Packet ⑤, generated to satisfy the next-hop link MTU=4, and transmits the packet to the destination node 550.

Since the size of the ICMP-PMTUD Minimizing Packet ⑤ which is transmitted by the second node 530 is greater than the next-hop link MTU value 3, the third node 540 generates an ICMP-Packet Too Big message ⑥ containing the next-hop link MTU information, that is, MTU=3, and transmits the message to the source node 510. Here, since the message is about an ICMP-PMTUD Minimizing Packet ⑤, the value in the "Code" field is 1.

Also, the third node 540 stores information stored in the "MTU", "Source Address," and "Destination Address" fields of the previous ICMP-PMTUD Minimizing Packet, that is, the ICMP-PMTUD Minimizing Packet ⑤ transmitted by the second node 530, in a cache, and generates an ICMP-PMTUD Minimizing Packet ⑦, which is generated to satisfy the next-hop link MTU=3, and transmits the packet to the destination node 550. The real data is then sent as illustrated at ⑧.

Meanwhile, after receiving the ICMP-Packet Too Big message ② which has the "Code" field value of 0 and which is transmitted by the first node 520, the source node 510 fragments the packet according to the link MTU value contained in the message, that is, MTU=5, and transmits the fragmented packet.

If the source node 510 receives the ICMP-Packet Too Big message ④ which has the "Code" field value of 1 and which is transmitted by the second node 530 before the source node transmits the packet fragmented according to the link MTU value, that is, MTU=5, contained in the ICMP-Packet Too Big message ② which has the "Code" field value of 0 and is transmitted by the first node 520, the source node 510 discards the packet fragmented according to the ICMP-Packet Too Big message ②, and again fragments the packet according to the MTU value, that is, the size of MTU=4, contained in the ICMP-Packet Too Big message ④ having the "Code" field value of 1, and transmits the fragmented packet.

If the source node 510 transmits the packet fragmented according to the MTU information, that is, MTU=5, contained in the ICMP-Packet Too Big message having the "Code" field value of 0, before the source node 510 receives the ICMP-Packet Too Big message having the "Code" field value of 1, the packet fragmented according to MTU=5 can arrive at the second node 530. However, since the next-hop link MTU is 4, the second node 530 discards the packet.

The second node 530 already stored information in the "MTU", "Source Address," and "Destination Address" fields of the ICMP-PMTUD Minimizing Packet ③ which was transmitted by the first node 520, in the cache. Since these values stored in the cache are the same as the information in the packet, the second node 530 does not generate a separate ICMP error message. By doing so, it is possible to prevent the unnecessary use of network resources.

In the embodiments according to the present invention, it is assumed that all nodes on the routing path between the source node and destination node support the modified ICMP-Packet Too Big message of FIG. 4A and the ICMP PMTUD Minimizing Packet that is the newly defined ICMP information message of FIG. 4B, according to the present invention. However, even if some of these nodes do not support the messages according to the present invention, PMTU discovery between the source node and destination node can be performed by using the related art PMTU discovery method.

Figure 7B:
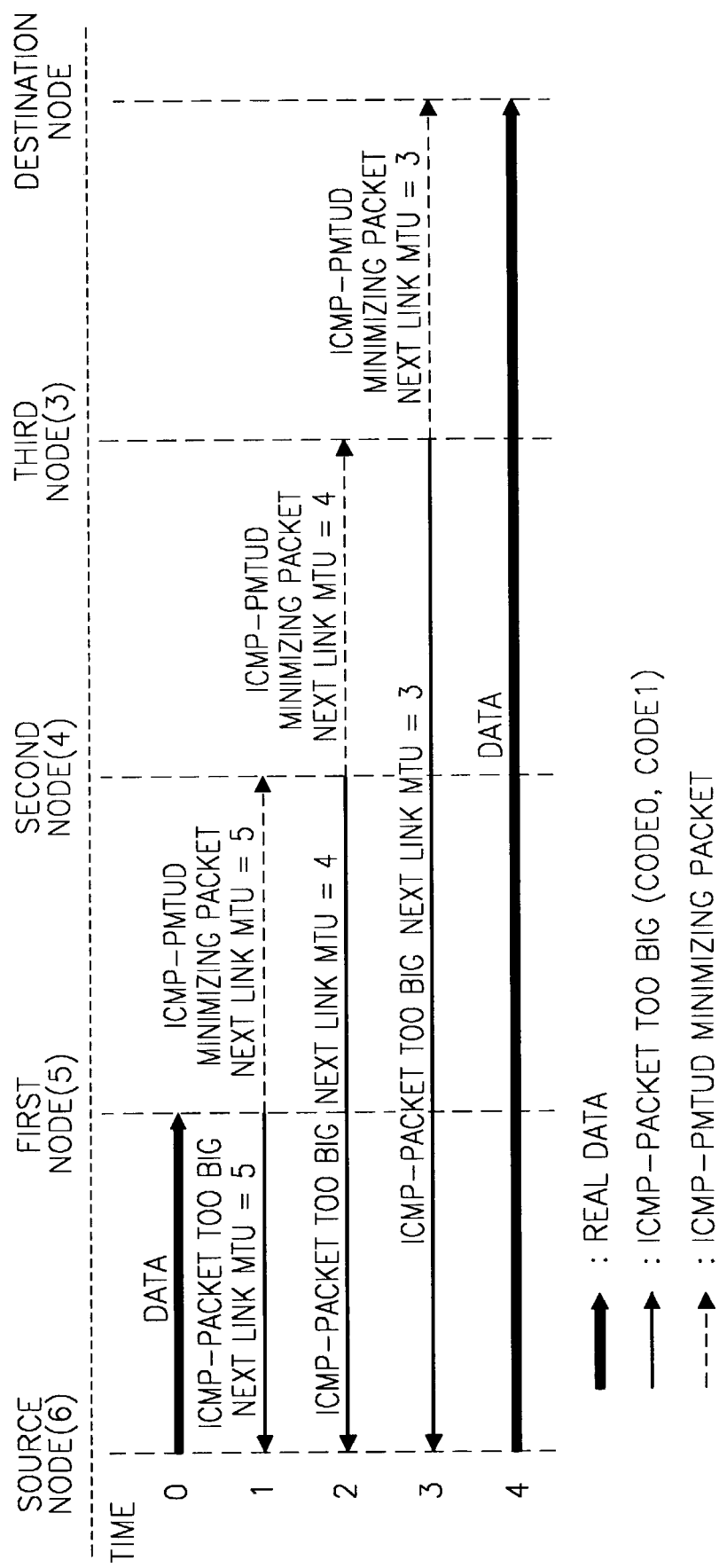
FIG. 7B is a diagram showing time and hop count spent in PMTU discovery by a PMTU discovery method according to according to an exemplary, non-limiting embodiment of the present invention.

FIGS. 7A and (b) show time and hop count used in PMTU discovery in a routing path, in which link MTU sequentially decreases, in the prior art PMTU discovery method and in the PMTU discovery method according to the present invention, respectively.

As shown in FIGS. 7A and (b), in the PMTU discovery method according to the present invention, a PMTU can be determined in a shorter time and the number of used hop counters decreases, compared to the prior art PMTU discovery method.

The present invention may be embodied in code on a computer readable recording medium which can be read by a computer. The computer readable recording medium includes all kinds of recording apparatuses on which computer readable data are stored.

The computer readable recording media includes storage media such as magnetic storage media (e.g., ROM's, floppy disks, hard disks, etc.), and optically readable media (e.g., CD-ROMs, DVDs, etc.) Also, the computer readable recording media can be scattered on computer systems connected through a network and can store and execute a computer readable code in a distributed mode.

Optimum embodiments have been explained above and are shown. However, the present invention is not limited to the preferred embodiment described above, and it is apparent that variations and modifications by those skilled in the art can be effected within the spirit and scope of the present invention defined in the appended claims.

The present invention has various advantages. For example, but not by way of limitation, when the PMTU discovery method according to the present invention is used, a PMTU can be determined in a shorter time, and it is possible to minimize the use of network resources. compared to the prior art PMTU discovery method.

What is claimed is:

1. A method for discovering a path maximum transmission unit (PMTU) among nodes on an Internet protocol (IP) network, comprising:
   at a node on the IP network,
   (a) comparing a size of a received packet with a maximum transmission unit (MTU) of a next link;
   (b) when the size of the received packet is greater than the MTU of the next link, generating an error message, transmitting the generated error message to a source node, generating a test message of the size of the MTU of the next link, and transmitting the generated test message to a destination node;
   (c) if the received packet is a test message generated by a previous node, storing MTU information, source address information and destination address information contained in the received packet; and
   (d) comparing the MTU information, source address information, and destination address information of a packet received after transmitting the error message generated in step (b) to the source node, with the MTU information, source address information, and destination address information stored in step (c), and when the information of the comparison is the same, discarding the received packet without generating an error message and a test message.

2. The method of claim 1, wherein the error message is an Internet Control Message Protocol (ICMP) error message that uses one of type numbers 0 to 127 in a "Type" field of an ICMP message of Internet Protocol version 6 (IPv6).

3. The method of claim 1, wherein the error message is an ICMP-Packet Too Big message of IPv6.

4. The method of claim 1, wherein the error message generated in step (b) contains MTU information of the next link.

5. The method of claim 1, wherein the test message is an ICMP information message that uses one of type numbers 128 to 255 in a "Type" field of an ICMP message of IPv6.

6. The method of claim 1, wherein the test message generated in step (b) contains source address information and destination address information of the received packet.

7. An apparatus for discovering a path maximum transmission unit (PMTU) among nodes on an Internet protocol (IP) network, comprising:
   a memory:
   a processor:
   a determining unit that determines whether a size of a received packet exceeds the MTU of a next link;
   an error message generation and transmission unit that, when the size of the received packet is greater than the MTU of the next link, generates an error message and transmits the generated error message to a source node; and
   a test message generation and transmission unit that generates a test message of the size of the MTU of a next link and transmits the generated test message to a destination node;
   wherein if the received packet is a test message generated by a previous node, the apparatus stores MTU information, source address information and destination address information contained in the received packet;
   wherein when the MTU information, source address information, and destination address information of a packet received after transmitting the generated error message to the source node are the same as the stored MTU information, source address information, and destination address information, the received packet is discarded without generating an error message and a test message.

8. The apparatus of claim 7, wherein the error message is an Internet Control Message Protocol (ICMP) error message that uses one of type numbers 0 to 127 in a "Type" field of an ICMP message of Internet Protocol version 6 (IPv6).

9. The apparatus of claim 7, wherein the error message is an ICMP-Packet Too Big message of IPv6.

10. The apparatus of claim 7, wherein the generated error message contains MTU information of the next link.

11. The apparatus of claim 7, wherein the test message is an ICMP information message that uses one of type numbers 128 to 255 in a "Type" field of an ICMP message of IPv6.

12. The apparatus of claim 7, wherein the generated test message contains source address information and destination address information of the received packet.

13. The apparatus of claim 7, wherein the apparatus comprises at least one of a router, a bridge and a switch.

14. A computer storage media containing a set of instructions to discovering a path maximum transmission unit (PMTU) among nodes on an Internet protocol (IP) network, the instructions comprising:

at a node on the IP network,
(a) comparing a size of a received packet with a maximum transmission unit (MTU) of a next link;
(b) when the size of the received packet is greater than the MTU of the next link, generating an error message, transmitting the generated error message to a source node, generating a test message of the size of the MTU of the next link, and transmitting the generated test message to a destination node;
(c) if the received packet is a test message generated by a previous node, storing MTU information, source address information and destination address information contained in the received packet; and
(d) comparing the MTU information, source address information, and destination address information of a packet received after transmitting the error message generated in step (b) to the source node, with the MTU information, source address information, and destination address information stored in step (c), and when the information of the comparison is the same, discarding the received packet without generating an error message and a test message.

15. The computer storage media of claim 14, wherein the error message is an Internet Control Message Protocol (ICMP) error message that uses one of type numbers 0 to 127 in a "Type" field of an ICMP message of Internet Protocol version 6 (IPv6).

16. The computer storage media of claim 14, wherein the error message is an ICMP-Packet Too Big message of IPv6.

17. The computer storage media of claim 14, wherein the error message generated in (b) contains MTU information of the next link.

18. The computer storage media of claim 14, wherein the test message is an ICMP information message that uses one of type numbers 128 to 255 in a "Type" field of an ICMP message of IPv6.

19. The computer storage media of claim 14, wherein the test message generated in (b) contains source address information and destination address information of the received packet.

* * * * *